Patented May 18, 1943

2,319,547

UNITED STATES PATENT OFFICE 2,319,547

PRODUCTION OF PHOTOGRAPHIC SENSITIZING DYESTUFFS

John David Kendall and Ronald Bernard Collins, Ilford, England, assignors to Ilford Limited, Ilford, England, a British company No Drawing. Application April 25, 1940, Serial No. 331,674. In Great Britain May 5, 1939

16 Claims. (Cl. 260—240)

This invention relates to the production of dyestuffs and especially to the production of dyestuffs which are capable of optically sensitizing silver halide photographic emulsions.

It is an object of the invention to provide a new process for the manufacture of dyestuffs. A further object of the invention is to provide a new range of dyestuffs especially suitable for sensitizing silver halide photographic emulsions. A still further object is to provide silver halide emulsions sensitized by means of the new dyestuffs. Further objects will appear hereinafter.

According to the present invention, dyestuffs are obtained by condensing a compound of the general Formula 1

(1) 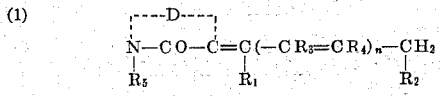

in which $R_1$, $R_2$, $R_3$, $R_4$ and $R_5$ may be the same or different and respresent hydrogen atoms or hydrocarbon groups, for example, alkyl groups, e. g. methyl, ethyl and higher alkyl groups, aralkyl groups, e. g. benzyl groups or aryl groups, e. g. phenyl or naphthyl groups, D is the residue of a 5-membered heterocyclic ring, and $n$ is nought or a small positive integer, e. g. 1, 2 or 3, with a quaternary salt of a heterocyclic nitrogen compound having a reactive group in the α or γ position to the heterocyclic nitrogen atom.

The reactive group may be, for example, a thio-ether or seleno-ether group (including an aryl-, alkyl- or aralkyl-thio-ether or seleno-ether group) or an aminovinyl type of group, i. e. a $-(CH=CH)_n-NH_2$ group where $n$ is a positive integer or an N-substituted group of this type (including N-acyl, N-aryl and N-acylaryl substituted groups of this type) or a halogen atom.

As examples of 5-membered heterocyclic rings of which D is the residue, there may be mentioned rhodanic acid, 4-keto-2-seleno tetrahydro thiazole, oxindoles, true hydantoins and thiohydantoins, pseudo-hydantoins and pseudo-thiohydantoins, pyrazolones, 2.4-diketo-tetrahydro-selenazoles, 4-keto-2-thio(or seleno) tetrahydrooxazoles and selenazoles and their N-alkyl, N-aryl and N-aralkyl substitution compounds, wherein the alkyl, aryl and aralkyl substituents have the same values as the R's of Formula 1.

The various reactions are based on the induced reactivity of the methylene group at the right hand end of Formula 1 and depend on the removal of the two hydrogen atoms of that methylene group with the resulting formation of a double bond linking the carbon atom of the methylene group to the residue of the other reactant.

The mechanism of the reaction is illustrated by the following two equations in which $D_1$ represents the residue of a heterocyclic nucleus, X represents an acid radical and $R_6$ and $R_7$ represent the same or different hydrocarbon radicals, for example, alkyl, aryl or aralkyl groups. Suitable specific hydrocarbon groups include methyl, ethyl, isopropyl and higher alkyl groups, phenyl, chlorphenyl, naphthyl, benzyl and tolyl groups. As examples of suitable acid groups mention is made of halogen, e. g. chloride, bromide and iodide, p-toluene sulphonate, sulphate, methylsulphate, ethylsulphate and perchlorate.

(a) When a compound conforming with Formula 1 is reacted with a quaternary salt of a heterocyclic nitrogen compound containing a reactive thio-ether group the reaction proceeds as follows:

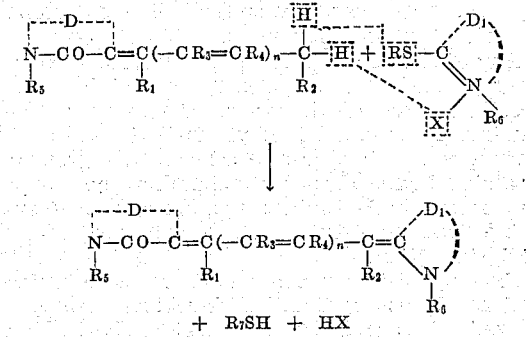

(b) When a compound conforming with Formula 1 is reacted with a quaternary salt of a heterocyclic nitrogen compound containing a reactive aminovinyl type of group, e. g.

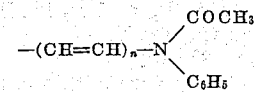

the reaction proceeds as follows:

(A similar reaction occurs when other substituted amino-vinyl groups are present as the reactive groups, for instance, other acylamino vinyl groups, e. g. propionyl amino vinyl and butyryl amino vinyl groups and higher homologues, other arylamino groups, e. g. naphthylamino vinyl groups and higher homologues, other acylarylamino vinyl groups, e. g. propionyl phenyl amino vinyl groups, alkylamino vinyl groups and aralkylaminovinyl groups.)

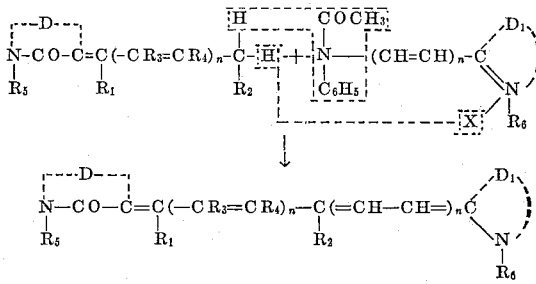

Compounds of the general Formula 1 used in the production of the compounds according to the invention may be made by any suitable method. One suitable method is to condense a cyclic compound of the general Formula 2

(2) 

where D is the residue of a 5-membered ring, with an aldehyde or ketone of the Formula 3

(3) 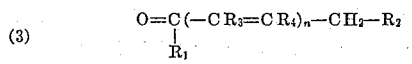

wherein $R_1$, $R_2$, $R_3$, $R_4$ and $n$ have the same significance as in Formula 1, the condensation resulting in the elimination of the two hydrogen atoms of the methylene group of the cyclic nucleus and the ketonic or aldehyde oxygen atom of the aldehyde or ketone.

Examples of compounds of the type of Formula 1 which may be used in the process of the invention are those produced by condensing pyrazolone and substituted pyrazolones, e. g. 1-phenyl-3-methyl-5-pyrazolone, 3-methyl-5-pyrazolone, 1-phenyl-5-pyrazolone and 1:3-diphenyl-5-pyrazolone, rhodanic acid and its substitution products, e. g. N-phenyl rhodanic acid, and oxindole and its substitution products, with acetaldehyde, propionaldehyde, crotonaldehyde, phenyl-acetaldehyde, acetone, acetophenone, ethylidene acetone and ethylidene acetophenone.

Any of the known types of heterocyclic quaternary ammonium compounds containing the specified reactive thioether, seleno-ether (including, for example, ethyl, methyl, isopropyl, phenyl etc., thioether and seleno-ether groups) or aminovinyl or N-substituted aminovinyl groups commonly employed in the manufacture of cyanine dyestuffs may be employed in the process of the invention.

Examples of such compounds are substituted and unsubstituted thiazoles, thiazolines, oxazoles, oxazolines, selenazoles, selenazolines, pyridines, quinolines, indolenines, diazines (for example pyrimidines), thiodiazoles and quinazolines, including the corresponding substituted and unsubstituted polycyclic compounds such as benzthiazoles, naphthothiazoles and anthrathiazoles and also the diazoles described in British Patent Specification No. 425,609.

The condensation is preferably effected in the presence of an acid binding agent, e. g. pyridine, piperidine, trialkylamine or other organic base, sodium ethoxide, sodium acetate or other inorganic base of comparable basicity.

It will be appreciated that the dyestuffs produced according to the present invention consists of a five-membered heterocyclic keto-methylene residue linked to another heterocyclic nitrogen residue by a polymethine chain. For the sake of clarity in naming the products the following system is hereinafter adopted; the name of the five-membered heterocyclic ring compound is given first, then the nature and degree of substitution of the polymethine chain, and then the name of the other heterocyclic nitrogen nucleus. In defining the position of substitution in the polymethine chain, the methine groups are numbered starting from that nearest the heterocyclic nitrogen keto-methylene compound as the 6-position, 7-position etc.

The following examples illustrate the invention:

EXAMPLE 1

(1-phenyl-3-methyl-5-pyrazolone-4)-6 - methyldimethine-(2-methylbenzthiazole-1)

1.81 grams of 1-methylthiolbenzthiazole (reagent A) and 1.86 grams of methyl-p-toluene sulphonate (reagent B) were mixed together and heated on an oil bath at 130–140° C. for three hours. 2.14 grams of 1-phenyl-3-methyl-4-isopropylidene-5-pyrazolone (reagent C) and 15 cc. of pyridine were then added. The mixture was then warmed on a water bath and afterwards boiled gently for half-an-hour. The mixture was then transferred to a breaker and the precipitated product separated by filtration. On recrystallization from ethyl alcohol, the product was obtained as bright red needles, melting at 261° C. with decomposition.

The product is a sensitizing dyestuff, extending the sensitivity of a silver chloride emulsion to about 5800 Å. with a maximum sensitivity at about 4600 Å.

EXAMPLE 2

(1-phenyl-3-methyl-5-pyrazolone-4) -6 - methyldimethine-(2-ethylbenzthiazole-1)

By an analogous process to that of Example 1 using 2.0 gm. of ethyl-p-toluene sulphonate as reagent B, the above dyestuff may be obtained as red crystals having a melting point of 248–258° C.

This dyestuff sensitizes silver chloride emulsions over the range 4400–4800 Å.

EXAMPLE 3

(1-phenyl-5-pyrazolone - 4 ) -6-phenyldimethine-(2-methylbenzthiazole-1)

By a process analogous to that of Example 1 using 2.0 gm. of 1-phenyl-4-phenylmethylmethylene-5-pyrazolone as reagent C, the above dyestuff may be obtained as reddish brown crystals having a melting point of 254° C. This dyestuff extends the sensitivity of a silver chloride emulsion to about 5750 Å. with a maximum sensitivity at about 5200 A. Included in a silver bromide emulsion it extends the sensitivity to about 5800 A. with a maximum sensitivity at about 5600 A.

EXAMPLE 4

(1-phenyl-5-pyrazolone-4) - 6-methyldimethine-(2-methylbenzthiazole-1)

By a process analogous to that of Example 1 using 2 gm. of N-phenyl-4-isopropylidene-5-pyrazolone as reagent C, the above dyestuff may be obtained as red crystals melting at 248° C. This dyestuff extends the sensitivity of a silver chloride emulsion to about 5700 A. with a maximum sensitivity at about 4800 A. Included in a silver bromide emulsion it extends the sensitivity to about 6000 A. with a maximum sensitivity at about 5200 A.

EXAMPLE 5

*(1-phenyl-3-methyl-5-pyrazolone-4)-dimethine- (2-methylbenzthiazole-1)*

By a process analogous to that of Example 1 using 2 gm. of 1-phenyl-3-methyl-4-ethylidene-5-pyrazolone as reagent C the above dyestuff may be obtained as scarlet crystals having melting point of 262° C.

This dyestuff included in a silver chloride emulsion extends the sensitivity to about 5800 A. with a maximum sensitivity at about 4750 A. Included in a silver bromide emulsion it extends the sensitivity to about 5850 A. with a maximum at about 4800 A.

EXAMPLE 6

*(1-phenyl-3-methyl-5-pyrazolone-4) - 6 - phenyl- dimethine-(2-methylbenzthiazole-1)*

By a process analogous to that of Example 1 using 2.76 gm. of 1-phenyl-3-methyl-4-phenyl-methylmethylene-5-pyrazolone as reagent C, the above dyestuff may be obtained as red crystals having a melting point of 251° C. This dyestuff included in a silver chloride emulsion extends the sensitivity to about 5700 A. with a maximum at about 5200 A.

EXAMPLE 7

*(1-phenyl-3-methyl-5-pyrazolone-4) - 6- phenyl- dimethine-(2-methylbenzoxazole-1)*

By a process analogous to that of Example 1 using 1.65 grams of 1-methylthiolbenzoxazole, 1.86 gm. of methyl-p-toluene sulphonate, 2.76 gm. 1-phenyl-3-methyl-4-phenylmethylmethylene-5-pyrazolone and 10 cc. of pyridine, the above dyestuff may be obtained as orange red crystals melting at 217° C. This dyestuff incorporated in a silver chloride emulsion imparts sensitivity at about 4800 A. to 4900 A.

EXAMPLE 8

*(1 -p-chlorphenyl-3-methyl- 5 -pyrazolone-4) -6- methyldimethine-(2-methylbenzthiazole-1)*

By a process analogous to that of Example 1 using 2.48 gm. of 1-p-chlorphenyl-3-methyl-4-isopropylidene-5-pyrazolone as reagent C, the above dyestuff may be obtained as red crystals melting at 264° C. This dyestuff included in a silver bromide emulsion extends the sensitivity to about 5200 A. with a maximum at about 4600 A.

EXAMPLE 9

*(1-phenyl-)-methyl- 5 -pyrazolone-4)-7-phenyl- dimethine-(2-methylbenzthiazole-1)*

1.81 grams of 1-methylthiolbenzthiazole and 1.86 gm. of methyl-p-toluene sulphonate were mixed together and fused on an oil bath at 130–140° C. 2.76 grams of 1-phenyl-3-methyl-4-ω-phenyl-3-thylidene-5-pyrazolone and 15 cc. of pyridine were then added. The mixture was then warmed on a water bath and gently boiled for forty minutes. The mixture was then poured into a beaker and cooled. Water was added and an oil separated. The oil was triturated with ethyl alcohol and green-brown crystals obtained therefrom.

On recrystallization from methyl alcohol, the product was obtained as small brown crystals melting at 230° C. with decomposition. This dyestuff included in a silver chloride emulsion imparts sensitivity between 5100 and 5400 A.

EXAMPLE 10

*(1-phenyl-3-methyl- 5 -pyrazolone-4) - 6-phenyl- tetramethine-(1:3:3-trimethylindolenine-2)*

1.38 grams of 1-phenyl-3-methyl-4-phenyl-methylmethylene-5-pyrazolone, 2.23 grams of 2-ω-acetanilidovinyl - 1.3.3 - trimethyl - indolenium iodide and 20 cc. of pyridine were mixed together, warmed on a water bath for fifteen minutes and then gently boiled for thirty minutes. The mixture was then poured into a beaker and cooled. On dilution with water a tarry product separated. The solution was decanted and the tarry product dissolved in hot ethyl alcohol. On cooling this solution the product separated as green crystals which on recrystallization from ethyl alcohol had a melting point of 214–216° C. This dyestuff included in a silver chloride emulsion imparts sensitivity between 6200 A. and 6600 A.

EXAMPLE 11

*(1-phenyl-3-methyl- 5 -pyrazolone-4) -6-methyl- tetramethine-(2-methylbenzthiazole-1)*

0.9 gm. of 1-methylthiolbenzthiazole and 0.98 gram of methyl-p-toluene sulphonate were mixed together and fused at 160° C. for three hours. There was then added 1.2 grams of 1-phenyl-3-methyl-4-α-methyl crotonylidene-5-pyrazolone and 15 cc. of pyridine. The mixture was gently refluxed for thirty-five minutes. Water was added and a red oil separated. This was treated with ethyl alcohol and a red solid was separated therefrom by freezing. On recrystallization the product was obtained as a red solid melting at 260° C. This dyestuff included in a silver chloride emulsion extends the sensitivity to about 5700 A. with a maximum at about 5200 A.

EXAMPLE 12

*(1-phenyl-3-methyl- 5 -pyrazolone-4) - 6-phenyl- dimethine-(1-methylquinoline-2)*

1.75 grams of 2-methylthiolquinoline and 1.86 grams of methyl-p-toluene sulphonate were mixed together and fused at 130–140° C. for four hours. There was then added 2.76 grams of 1-phenyl-3-methyl-4-phenyl methyl methylene-5-pyrazolone (reagent C) and 10 cc. of pyridine. The mixture was warmed on a water bath, boiled for half an hour and then cooled. Alcohol was then added and the solution filtered. The product was obtained as small green crystals with a gold reflex, melting at 281° C.

EXAMPLE 13

*(1-phenyl- 5 -pyrazolone-4) - 6-phenyldimethine- (1-methylquinoline-2)*

By a process analogous to that of Example 12 using 2 grams of 1-phenyl-4-phenylmethylmethylene-5-pyrazolone as reagent C the above dyestuff was obtained as a green solid having a melting point of 272° C.

EXAMPLE 14

*(2-thio- 4 -ketotetrahydrothiazole-5)-dimethine- (2-methylbenzthiazole-1)*

1.81 grams of 1-methylthiolbenzthiazole and 1.86 grams of methyl-p-toluene sulphonate were mixed together and fused on an oil bath at 130–140° C. for three hours. 1.63 grams of ethylidene rhodanic acid and 15 cc. of pyridine were then added. The mixture was then gently boiled for 45 minutes, transferred to a beaker and allowed to stand overnight. purple crystals separated and a second crop of crystals was obtained by diluting with a small quantity of water. The product was purified by boiling it with absolute alcohol. The product is a sensitising dyestuff. Tested with a silver chloride emulsion it extends the sensitivity to about 6000 Å. with a maximum sensitivity at about 5800 Å. Tested with a silver bromide emulsion it extends the sensitivity to about 6200 Å. with a maximum sensitivity at about 5800 Å.

Example 15

(2 - thio-3-phenyl-4-keto-tetrahydrothiazole-5)-dimethine-(2-methylbenzthiazole-1)

By a process analogous to that of Example 14 using 2.35 grams of 2-thio-3-phenyl-4-keto-5-ethylidene tetrahydrothiazole instead of ethylidene rhodanic acid, the above dyestuff may be obtained as an orange solid melting at 310° C. This dyestuff included in the silver chloride emulsion extends the sensitivity to about 5000 Å. with a maximum at about 4700 Å. Included in a silver bromide emulsion it extends the sensitivity to 6200 Å. with a maximum at about 5800 Å.

Example 16

(2 - thio - 3-methyl-4-ketotetrahydrothiazole-5) - dimethine-(2-methylbenzthiazole-1)

By a process analogous to that of Example 14 using 1.77 grams of N-methyl-ethylidene rhodanic acid instead of ethylidene rhodanic acid the above dyestuff may be obtained as a red solid melting at 256° C. This dyestuff extends the sensitivity of a silver chloride emulsion to about 5200 Å.

Example 17

(1 - phenyl-3-methyl-5-pyrazolone-4)-6-methyl-7 - carbethoxy - dimethine -(2-methylbenzthiazole-1)

By a process analogous to that of Example 14 using 2.86 grams of 1-phenyl-3-methyl-4-methylcarbethoxy methylmethylene-5-pyrazolone instead of ethylidene rhodanic acid, the above dyestuff may be obtained as red crystals, melting at 263° C. This dyestuff extends the sensitivity of a silver chloride emulsion to about 5800 Å. with a maximum at about 4700 Å. Included in a silver bromide emulsion it extends the sensitivity to about 5800 Å. with a maximum at about 5000 Å.

Example 18

(2 - thio - 4-ketotetrahydroiminazole-5)-dimethine-(2-methylbenzthiazole-1)

1.81 grams of 1-methylthiolbenzthiazole and 1.86 grams of methyl-p-toluene sulphonate were mixed together and heated on an oil bath for three hours at 130–140° C. There was then added 1.46 grams of ethylidene-thio-hydantoin and 15 cc. of pyridine. The mixture was heated over a flame for half an hour during which an orange colour developed. The mixture was transferred to a beaker and diluted with water whereupon an oil separated out. This oil was treated with ethyl alcohol and the product obtained therefrom as red crystals melting at 205° C. This dyestuff included in a silver chloride emulsion imparts sensitivity between 5500 Å. and 5650 Å. Included in a silver bromide emulsion it extends the sensitivity to 5800 Å.

Example 19

(2 - thio-3-phenyl-4-keto-tetrahydrothiazole-5)-tetramethine-(2-methylbenzthiazole-1)

1.81 grams of 1-methylthiolbenzthiazole and 1.86 grams of methyl-p-toluene sulphonate were heated on an oil bath at 130–140° C. for three hours. Crotonylidene-N-phenyl rhodanic acid and 20 cc. of pyridine were then added and the mixture warmed on a water bath for twenty minutes and then boiled for a further 25 minutes. The mixture was then diluted with water whereupon an oil separated out. On treating this oil with acetone and ethyl alcohol, the product was obtained as a blue solid melting at 170° C.

Example 20

(1 - phenyl-3-methyl-5-pyrazolone-4)-6-methyl-dimethine-(1-ethylquinoline-2)

2.14 grams of 1-phenyl-3-methyl-4-isopropylidene-5-pyrazolone and 4.11 gm. of 2-iodoquinoline ethiodide were added to a solution of 0.6 gm. sodium in 25 cc. of ethyl alcohol and the mixture was boiled under reflux for 25 minutes. The solution was then evaporated to half its bulk and allowed to cool whereupon the product separated as red crystals which, after recrystallization, had a melting point of 282° C.

The dyes of this invention may be used for the sensitization of silver halide emulsions generally, e. g. chloride, chlorobromide, bromide and iodobromide emulsions.

The compounds 1-phenyl-3-methyl-4-isopropropylidene-5-pyrazolone, 1-phenyl-3-methyl-4-ω-phenylethylidene-5-pyrazolone and 1-phenyl-3-methyl-4-phenylmethylmethylene - 5 - pyrazolone used in Examples 1, 9 and 10 may be prepared by condensing 1-phenyl-3-methyl-5-pyrazolone with acetone, phenylacetaldehyde and acetophenone respectively by the general methods described in our co-pending application No. 265,998 filed April 4, 1939, now United States Patent 2,213,986.

Ethylidene rhodanic acid may be made by mixing successively 1 gram of acetaldehyde ammonia, 1 gram of rhodanic acid, 5 cc. of ethyl alcohol and 0.5 cc. of water and 3.4 cc. of concentrated hydrochloric acid, warming on a water-bath for 15 minutes until the mass sets solid, adding water, filtering off the brown solid remaining and recrystallizing this product from hot ethyl alcohol. The product has a melting point of 147–8° C.

In the following claims, the expressions "thio-ether group," "seleno-ether group" and "amino-vinyl group" have been used for the sake of briefness but it is to be understood that the first two of these expressions include the corresponding aryl-, alkyl-, and aralkyl-thioether and -selenoether groups and that the third expression includes groups of the formula

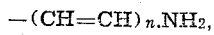

(where $n$ is a positive integer), and includes N-acyl, N-aryl and N-acylaryl substituted groups of this type.

1. Process for the manufacture of dyestuffs which comprises condensing a compound of the general formula:

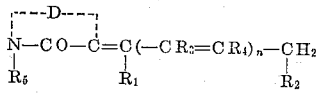

where $R_1$, $R_2$, $R_3$, $R_4$ and $R_5$ are each groups selected from the class consisting of hydrogen atoms and hydrocarbon groups, D is the residue of a five-membered heterocyclic ring and $n$ is selected from the group consisting of nought and positive integers, with a quaternary salt of a heterocyclic nitrogen compound of the type used in the production of cyanine dyes which contains a reactive group taken from the group consisting of thio-ether, selenoether and amino-vinyl group in one of the α and γ positions to the heterocyclic quaternary nitrogen atom, by heating said compounds in admixture.

2. Process for the manufacture of dyestuffs which comprises condensing a compound of the general formula:

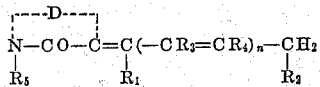

where $R_1$, $R_2$, $R_3$, $R_4$ and $R_5$ are each groups selected from the class consisting of hydrogen atoms and hydrocarbon groups, D is the residue of a five-membered heterocyclic ring and $n$ is selected from the group consisting of nought and positive integers, with a quaternary salt of a heterocyclic nitrogen compound of the type used in the production of cyanine dyes which contains a reactive group taken from the group consisting of thioether, selenoether and amino-vinyl group in one of the α and γ positions to the heterocyclic quaternary nitrogen atom, by heating said compounds in admixture, in the presence of a basic condensing agent.

3. Process for the manufacture of dyestuffs which comprises condensing a compound of the general formula:

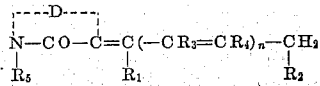

where $R_1$, $R_2$, $R_3$, $R_4$ and $R_5$ are each groups selected from the class consisting of hydrogen atoms and hydrocarbon groups, D is the residue of a five-membered heterocyclic ring and $n$ is selected from the group consisting of nought and positive integers with a quaternary salt of a heterocyclic nitrogen compound of the type used in the production of cyanine dyes which contains a reactive group selected from the group consisting of thio-ether groups and seleno-ether groups in one of the α and γ positions to the heterocyclic quaternary nitrogen atom by heating said compounds in admixture in the presence of a basic condensing agent.

4. Process for the manufacture of dyestuffs which comprises condensing a compound of the general formula:

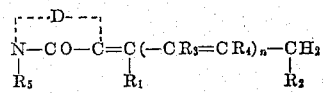

where $R_1$, $R_2$, $R_3$, $R_4$ and $R_5$ are each groups selected from the class consisting of hydrogen atoms and hydrocarbon groups, D is the residue of a five membered heterocyclic ring and $n$ is selected from the group consisting of nought and positive integers with a quaternary salt of a heterocyclic nitrogen compound of the type used in the production of cyanine dyes which contains a reactive thio-ether group in one of the α and γ positions to the heterocyclic quaternary nitrogen atom by heating said compounds in admixture in the presence of a basic condensing agent.

5. Process for the manufacture of dyestuffs which comprises condensing a compound of the general formula:

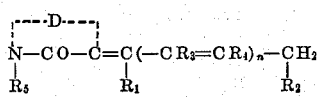

where $R_1$, $R_2$, $R_3$, $R_4$ and $R_5$ are each groups selected from the class consisting of hydrogen atoms and hydrocarbon groups, D is the residue of a five membered heterocyclic ring and $n$ is selected from the group consisting of nought and positive integers with a quaternary salt of a heterocyclic nitrogen compound of the type used in the production of cyanine dyes which contains a reactive amino-vinyl group in one of the α and γ positions to the heterocyclic quaternary nitrogen atom by heating said compounds in admixture in the presence of a basic condensing agent.

6. Process for the manufacture of dyestuffs which comprises condensing a compound of the general formula:

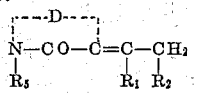

where $R_1$, $R_2$ and $R_5$ are each groups selected from the class consisting of hydrogen atoms and hydrocarbon groups and D is the residue of a five-membered heterocyclic ring with a quaternary salt of a heterocyclic nitrogen compound of the type used in the production of cyanine dyes which contains a reactive group selected from the group consisting of the thioether and selenoether groups in one of the α and γ positions to the heterocyclic quaternary nitrogen atom, by heating said compounds in admixture in the presence of a basic condensing agent.

7. Process for the manufacture of dyestuffs which comprises condensing a compound of the general formula:

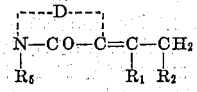

where $R_1$, $R_2$ and $R_5$ are each groups selected from the class consisting of hydrogen atoms and hydrocarbon groups and D is the residue of a five-membered heterocyclic ring, with a quaternary salt of a heterocyclic nitrogen compound of the type used in the production of cyanine dyes which contains a reactive thio-ether group in one of the α and γ positions to the heterocyclic quaternary nitrogen atom, by heating said compounds in admixture in the presence of a basic condensing agent.

8. Process for the manufacture of dyestuffs which comprises condensing a compound of the general formula:

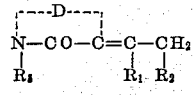

where $R_1$, $R_2$ and $R_5$ are each groups selected from the class consisting of hydrogen atoms and hydrocarbon groups and D is the residue of a five-membered heterocyclic ring with a quaternary salt of a heterocyclic nitrogen compound of the type used in the production of cyanine dyes which contains a reactive amino-vinyl group in one of the α and γ positions to the heterocyclic quaternary nitrogen atom, by heating said compounds in admixture in the presence of a basic condensing agent.

9. Process for the manufacture of dyestuffs which comprises condensing a compound of the general formula:

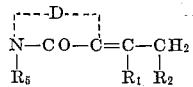

where $R_1$, $R_2$ and $R_5$ are each groups selected from the class consisting of hydrogen atoms and hydrocarbon groups and D is the residue of a pyrazolone nucleus with a quaternary salt of a heterocyclic nitrogen compound of the type used in the production of cyanine dyes which contains a reactive group selected from the class consisting of thio-ether and seleno-ether groups in one of the $\alpha$ and $\gamma$ positions to the heterocyclic quaternary nitrogen atom, by heating said compounds in admixture in the presence of a basic condensing agent.

10. Process for the manufacture of dyestuffs which comprises condensing a compound of the general formula

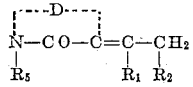

where $R_1$, $R_2$ and $R_5$ are each groups selected from the class consisting of hydrogen atoms and hydrocarbon groups and D is the residue of a pyrazolone nucleus, with a quaternary salt of a heterocyclic nitrogen compound of the type used in the production of cyanine dyes which contains a reactive thioether group in one of the $\alpha$ and $\gamma$ positions to the heterocyclic quaternary nitrogen atom, by heating said compounds in admixture in the presence of a basic condensing agent.

11. Process for the manufacture of dyestuffs which comprises condensing a compound of the general formula:

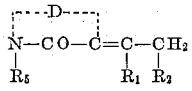

where $R_1$, $R_2$ and $R_5$ are each groups selected from the class consisting of hydrogen atoms and hydrocarbon groups and D is the residue of a pyrazolone nucleus, with a quaternary salt of a heterocyclic nitrogen compound of the type used in the production of cyanine dyes which contains a reactive aminovinyl group in one of the $\alpha$ and $\gamma$ positions to the heterocyclic quaternary nitrogen atom, by heating said compounds in admixture in the presence of a basic condensing agent.

12. Process for the manufacture of dyestuffs which comprises condensing a compound of the general formula:

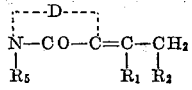

where $R_1$, $R_2$ and $R_5$ are each groups selected from the class consisting of hydrogen atoms and hydrocarbon groups and D is the residue of a pyrazolone nucleus, with a quaternary salt of benzthiazole which contains a reactive group selected from the class consisting of thioether and selenoether groups in the $\alpha$ position to the quaternary nitrogen atom, by heating said compounds in admixture in the presence of a basic condensing agent.

13. Process for the manufacture of dyestuffs which comprises condensing a compound of the general formula:

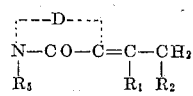

where $R_1$, $R_2$ and $R_5$ are each groups selected from the class consisting of hydrogen atoms and hydrocarbon groups and D is the residue of a pyrazolone nucleus, with a quaternary salt of benzthiazole which contains a reactive thio-ether group in the $\alpha$ position to the quaternary nitrogen atom, by heating said compounds in admixture in the presence of a basic condensing agent.

14. Process for the manufacture of dyestuffs which comprises condensing a compound of the general formula:

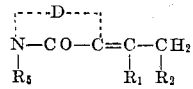

where $R_1$, $R_2$ and $R_5$ are each groups selected from the class consisting of hydrogen atoms and hydrocarbon groups and D is the residue of a pyrazolone nucleus, with a quaternary salt of benzthiazole which contains a reactive aminovinyl group in the $\alpha$ position to the quaternary nitrogen atom, by heating said compounds in admixture in the presence of a basic condensing agent.

15. Process for the preparation of dyestuffs which comprises condensing a 1-methylthiol-benzthiazole quaternary salt with 1-phenyl-3-methyl-4-isopropylidine-5-pyrazolone in the presence of a basic condensing agent.

16. Process for the preparation of dyestuffs which comprises condensing a 1-methylthiol-benzthiazole quaternary salt with N-phenyl-4-isopropylidine-5-pyrazolone in the presence of a basic condensing agent.

JOHN DAVID KENDALL.
RONALD BERNARD COLLINS.